United States Patent Office 3,362,946
Patented Jan. 9, 1968

3,362,946
METHOD OF TREATING SUPPORTED CHROMIUM OXIDE CATALYST AND POLYMERIZATION THEREWITH
John P. Hogan, Bartlesville, Okla., assignor to Phillips Petroleum Company, a corporation of Delaware
No Drawing. Filed June 1, 1964, Ser. No. 371,816
4 Claims. (Cl. 260—94.9)

This invention relates to catalysts containing chromium oxide which have been treated to increase their polymerization activity. In another aspect it relates to a method of making a chromium oxide-containing catalyst in a series of steps including treating the catalyst in order to increase its activity for polymerization. In still another aspect the invention relates to the polymerization of olefins with a catalyst which contains chromium oxide and has been prepared and treated in order to increase its polymerization activity.

In United States Patent 2,825,721, issued to J. P. Hogan and R. L. Banks, a catalyst is disclosed which is highly useful for the polymerization of olefins. As disclosed in this patent a catalyst which contains chromium oxide associated with at least one oxide selected from the group consisting of silica, alumina, zirconia and thoria can be used for the polymerization of monoolefins and diolefins to form polymers ranging from viscous liquids to tacky semi-solids and solids. This catalyst can be activated by calcining in a nonreducing atmosphere for a time sufficient to leave at least a portion of the chromium present in the hexavalent state. I have discovered a method of treating this catalyst in order to increase its activity for the polymerization of olefins to solid polymer.

An improvement on the catalyst preparation method of Hogan et al. is described in commonly assigned application, Lanning, Ser. No. 209,293, filed July 12, 1963. Lanning shows that the activity of the catalyst, following activation in the nonreducing atmosphere, can be increased by carbon monoxide treatment at 400 to 700° F. I have discovered that higher carbon monoxide treatment temperatures can be used provided that the preliminary activation in the nonreducing atmosphere is carried out at 1200 to 1600° F.

Thus, according to my invention, the activity of a polymerization catalyst containing chromium oxide and at least one material selected from the group consisting of silica, alumina, zirconia and thoria is increased after the catalyst has been activated to produce a catalyst containing hexavalent chromium by treating the thus activated catalyst with carbon monoxide at a temperature about 700° F. and up to 1000° F. The increased polymerization activity resulting from the treatment of the catalyst with carbon monoxide is quite surprising since it has been found that hydrogen does not produce the desired results.

The catalyst of my invention cannot be made directly as by a limited oxidation during the calcining step or by the inclusion of carbon monoxide in the essentially nonreducing atmosphere in which the catalyst is activated. It is necessary instead to activate the catalyst as described in the above-mentioned patent to Hogan and Banks in such a manner that at least a portion of the chromium present is in the hexavalent state. Then the activated catalyst is treated with carbon monoxide for a time of 1

It is an object of my invention to provide a method of increasing the activity of a chromium oxide-containing polymerization catalyst. Another object of my invention is to provide a method of making an improved polymerization catalyst containing chromium oxide. Still another object is to provide a chromium oxide-containing catalyst which has increased activity for the polymerization of olefins to solid polymer. Still another object of my invention is to provide a method of polymerizing olefins to solid polymer employing a catalyst which contains chromium oxide and which has been specially treated in order to obtain increased yields of solid polymer per unit weight of catalyst employed. Other objects, advantages, and features of my invention will be apparent to those skilled in the art from the following discussion.

The catalysts which are improved according to my invention are fully described in the above-mentioned patent of Hogan and Banks. A catalyst which I prefer is one consisting essentially of chromium oxide associated with at least one other oxide selected from the group consisting of silica, alumina, zirconia and thoria. I have found that my invention is particularly well suited for the treatment of catalysts which have been formed by impregnating the silica, alumina, zirconia, or thoria with the chromium compound which can then be converted by calcining to chromium oxide. I have also found that those catalysts in which the support is silica or predominately silica, for example silica with up to equal parts by weight of alumina, are particularly well suited for the carbon monoxide treatment. The amount of chromium as chromium oxide in the catalyst should be at least 0.1 weight percent and I prefer to work with those catalysts which contain at least 0.5 weight percent chromium. Considerably higher amounts (to 30 percent) of chromium can, of course, be present, as stated in the Hogan et al. patent. For ethylene polymerization the amount is generally in the range of 0.1 to 10 weight percent.

After the catalyst components have been combined, the composite is activated by heating in a nonreducing atmosphere at a temperature at least in the upper part of the range suggested by Hogan et al. and extending even higher. The activation temperature I use is in the range of 1200 to 1600° F. When preparing the catalyst to be treated according to my invention the activation atmosphere must be nonreducing and if reducing gases are present their amount must be sufficiently small that the essential activating character of the atmosphere is not affected. Preferably an oxidizing atmosphere such as air is used. The activating gases should be substantially water-free. Preferably the dew point of the gases is below 75° F. and more preferably below 0° F. Such activating conditions are essentially anhydrous.

The duration of the activation process can vary considerably so long as the catalyst is left with at least a portion of the chromium in hexavalent state, for example, so that catalyst contains at least 0.1 weight percent hexavalent chromium. This can be assured by employing the activating conditions described above for a period ranging, for example, from about 30 minutes up to 50 hours or more. The activation seldom exceeds 30 hours and more frequently is in the range of about 1 to 10 hours.

Following the activation of the catalyst it is treated by contact with carbon monoxide at a temperature above 700° F. and up to 1000° F. for 1 minute to 4 or more hours. Essentially pure carbon monoxide can be used but if diluted the atmosphere containing the carbon monoxide should be otherwise inert. Mixtures of carbon monoxide with inert gases such as helium, nitrogen, carbon dioxide or argon can be used. If such a gas stream is employed, in order to ensure adequate contact between the catalyst and the carbon monoxide the gas stream should contain at least 10 volume percent and preferably at least 20 volume percent carbon monoxide with the remainder being inert to the catalyst and to the carbon monoxide under the conditions of the contacting. The treating gas, like the activating gas, should be substantially anhydrous. Any method of gas-solids contacting can be employed, for example, with the catalyst in a stationary or fluidized bed.

The improved catalyst can be applied to the polymerization of any of the olefins, both monoolefins and diolefins, as disclosed in the Hogan and Banks patent. These are preferably the aliphatic mono-1-olefins having from 2 to 8 carbon atoms per molecule and no chain branching nearer the double bond than the 4-position and the lower conjugated diolefins. Examples of suitable monomers include ethylene, propylene, 1-butene, 1-pentene, 4-methyl-1-pentene, 1-hexene, 1-octene, butadiene, isoprene, and the like. Copolymers, including the copolymers of monoolefins, copolymers of diolefins and copolymers of mono- and diolefins are included. The conditions of polymerization are those set forth in the Hogan and Banks patent and need not be repeated in detail since they do not form a part of my invention per se. Generally the polymerization temperature is in the range of about 100 to 450° F. Both liquid and gas phase polymerizations can be used as can polymerizations in which the polymer is formed as a solid suspension in liquid diluent. The reaction medium can be the monomer or an inert diluent, preferably a hydrocarbon.

The advantages of my invention are further shown by the following examples in which conditions and proportions are presented as typical only and should not be construed to limit my invention unduly.

*Example I*

Catalysts were prepared by impregnating a commercial 9/10 silica-alumina cracking catalyst with sufficient aqueous chromium trioxide solution to give a chromium content of 1 weight percent as chromium oxide. These catalysts were activated in air for 5 hours at a temperature of 1400° F., treated with carbon monoxide at 950° F. for different times, and used for ethylene polymerization in 1-hour runs at 290° F. and 450 p.s.i.g. with 300 grams of cyclohexane solvent in a reactor equipped with a stirrer. The productivity was measured and reported in pounds of polymer per pound of catalyst per hour. The results without carbon monoxide and with treatment at different times are set forth in the following table:

CO treatment time, min.:      Polymer yield, lb./lb./hr.
    None (control) _____ 760
    5 _____ 780
    70 _____ 1005
    240 _____ 1070

This table shows that treatment for a very short time results in an improved catalyst but that treatment for a longer time, as much as 4 hours, gives still better results.

*Example II*

Catalysts prepared as in Example I but containing 0.5 weight percent chromium were activated in air for 5 hours at 1400° F., treated with carbon monoxide or hydrogen at 950° F. for different times, and tested as in Example I.

Treatment time, min.:      Polymer yield, lb./lb./hr.
    None (control) _____ 970
    CO—
       10 _____ 1160
       240 _____ 1090
    $H_2$—
       10 _____ 960
       20 _____ 9
       60 _____ 2

This table shows the marked improvement in polymer yield obtained by high temperature air activation followed by the high temperature carbon monoxide treatment. In contrast reduction with hydrogen drastically reduces the catalyst activity.

*Example III*

An additional series of catalysts were prepared in a similar manner by disposing chromium trioxide on a silica alumina composite containing 0.1 percent alumina. The catalyst contained 1.2 percent chromium trioxide. One group of catalysts was activated for 5 hours at 1000° F. and another group activated for 5 hours in air at 1400° F. Portions of each of these activated catalysts were contacted with carbon monoxide for one hour at different temperatures as shown in the following tabulation. Each catalyst, including one with no carbon monoxide treatment, was used for ethylene polymerization in 1-hour runs at 450 p.s.i.g. at 290 to 300° F. with 300 grams of cyclohexane in a reactor equipped with a stirrer. In each case the polyethylene obtained was a tough, thermoplastic material. The details of these runs are shown in the following table:

| Catalyst Preparation | | Polymerization | |
| --- | --- | --- | --- |
| Activation Temp., ° F. | CO-Reduction Temp., ° F. | Average Reactor Temp., ° F. | Polymer, Yield, lb./lb./hr. |
| 1,000 | None | 293 | 581 |
| 1,000 | 550 | 296 | 1,110 |
| 1,000 | 650 | 292 | 784 |
| 1,000 | 950 | 291 | 382 |
| 1,400 | None | 291 | 3,020 |
| 1,400 | 650 | 297 | 3,560 |
| 1,400 | 950 | 296 | 3,750 |

This table shows that the catalyst activated 5 hours at 1000° F. is partially deactivated if treated with carbon monoxide at a temperature above about 650° F. On the other hand, catalyst which is first activated at 1400° F. is made even more active by treatment with carbon monoxide at temperatures as high as 950° F.

As will be apparent to those skilled in the art, variations and modifications can be made in my invention without departing from the spirit or scope thereof.

I claim:

1. A method of making an improved polymerization catalyst which comprises depositing chromium compound on a material selected from at least one of the group consisting of silica, alumina, zirconia and thoria, heating the resulting composite at a temperature in the range of 1200 to 1600° F. in dry air to convert said compound to chromium oxide in which at least a portion of the chromium is hexavalent, and then treating the catalyst with carbon monoxide for 1 minute to 4 hours at a temperature above 700° F. and up to 1000° F.

2. A catalyst consisting essentially of about 0.5 to 30 one of the materials selected from the group consisting of silica, alumina, zirconia and thoria, said catalyst having been activated by heating at about 1200 to 1600° F. in an anhydrous oxidizing atmosphere and thereafter contacting the catalyst with carbon monoxide for 1 minute to 4 hours at a temperature above 700° F. and up to 1000° F.

3. A process which comprises polymerizing at least one polymerizable olefin with a catalyst active for such polymerization and comprising, as the sole essential effective catalytic ingredients thereof, chromium oxide and at least one material selected from the group consisting of silica, alumina, zirconia, and thoria, said catalyst having been activated by heating in a non-reducing atmosphere at a temperature in the range of 1200 to 1600° F. for a time sufficient to leave at least part of the chromium in the hexavalent state and thereafter contacted with carbon monoxide for 1 minute to 4 hours at a temperature above 700° F. and up to 1000° F., and recovering a resulting solid polymer.

4. A process for polymerizing ethylene which comprises contacting ethylene under polymerization conditions with a catalyst consisting of the product resulting from impregnating a support of silica and up to equal parts by weight of alumina with a chromium compound calcinable to chromium oxide, heating the resulting composite in dry air for 30 minutes to 30 hours at a temperature in the range of 1200 to 1600° F. and thereafter contacting the active catalyst with carbon monoxide in an otherwise inert atmosphere for 1 minute to 4 hours, at a temperature above 700° F. and up to 1000° F., and recovering a solid ethylene polymer.

References Cited

UNITED STATES PATENTS 3,166,537  1/1965  Gregg _____ 260—94.9

JOSEPH L. SCHOFER, *Primary Examiner.*

F. L. DENSON, *Assistant Examiner.*

UNITED STATES PATENT OFFICE
CERTIFICATE OF CORRECTION

Patent No. 3,362,946                         January 9, 1968

John P. Hogan

It is hereby certified that error appears in the above numbered patent requiring correction and that the said Letters Patent should read as corrected below.

Column 4, line 49, after "30" insert -- weight percent chromium as chromium oxide and at least --.

Signed and sealed this 29th day of April 1969.

(SEAL)
Attest:

Edward M. Fletcher, Jr.
Attesting Officer

EDWARD J. BRENNER
Commissioner of Patents